United States Patent [19]

Kondo et al.

[11] 4,320,092
[45] Mar. 16, 1982

[54] REACTION VESSEL

[75] Inventors: Jyunichi Kondo; Akira Sensyu; Hidetaka Ono; Hiroki Honda, all of Yokohama, Japan

[73] Assignee: Mitsubishi Jukogyo Kabushiki Kaisha, Tokyo, Japan

[21] Appl. No.: 178,273

[22] Filed: Aug. 15, 1980

[30] Foreign Application Priority Data

Aug. 24, 1979 [JP] Japan ................... 54-107100

[51] Int. Cl.³ .............................. B01F 3/04
[52] U.S. Cl. ..................... 422/224; 261/76; 261/79 A; 261/116; 261/DIG. 54
[58] Field of Search ...... 261/76, 79 A, 116, DIG. 54; 422/224

[56] References Cited

U.S. PATENT DOCUMENTS

| | | | |
|---|---|---|---|
| 2,887,390 | 5/1959 | Coulter et al. | 261/DIG. 54 |
| 2,897,062 | 7/1959 | Minarik | 261/DIG. 54 |
| 3,048,956 | 8/1962 | Lundy et al. | 261/DIG. 54 |
| 3,448,562 | 6/1969 | Wisting | 261/116 X |
| 3,488,039 | 1/1970 | Ekman | 261/DIG. 54 |
| 3,761,065 | 9/1973 | Rich et al. | 261/116 X |
| 3,767,177 | 10/1973 | Engalitcheff, Jr. et al. | 261/116 |

FOREIGN PATENT DOCUMENTS 1090810  4/1955  France ................... 261/DIG. 54

*Primary Examiner*—Richard L. Chiesa
*Attorney, Agent, or Firm*—Michael F. Petock

[57] ABSTRACT

Improvements in a reaction vessel which includes a lower cylindrical section conically reduced in diameter toward the outlet end and an upper cylindrical section conically increased in diameter from the inlet end, the two sections being joined endways, and wherein a gas stream is tangentially introduced into the lower cylindrical section and is caused to react, inside the upper section, with a reactant liquid injected into the latter. A horizontal partition is provided within the lower cylindrical section conically reduced in diameter to divide the space therein into an upper and a lower spaces, whereby the gas stream is divided and separately passed, in a spiral flow from the upper space and in a piston flow from the lower space, into the upper cylindrical section.

2 Claims, 6 Drawing Figures

REACTION VESSEL

This invention relates to improvements in a reaction vessel for gas-liquid or gas-slurry reactions, the vessel body being composed of two cylindrical sections, one conically reduced and the other increased in diameter and joined end-to-end.

With conventional reaction vessels of the character, as typically represented in FIGS. 1 and 2, a gas is tangentially introduced through an inlet duct a into the lower cylindrical section b conically reduced in diameter toward the outlet end, or tapered upward. As the gas flows upward, while maintaining the spiral pattern, into the upper cylindrical section c tapered conically downward, a generally cylindrical backflow region as indicated by arrows x is formed in the middle part of the vessel. This backflow hinders a stable reaction of the gas with a liquid or slurry.

A modified design of the prior art, illustrated in FIGS. 3 and 4, uses guide vanes d in a circular arrangement inside the lower, upwardly tapered section b. As the vanes lift up the swirling gas in a piston flow, some outer portion of the piston comes off inside the inverted cone of the upper cylindrical section c, forming a deviative flow y as shown.

The present invention is proposed to overcome those difficulties of the prior art and to provide a reaction vessel with an improved reaction efficiency. Thus the invention is concerned with a reaction vessel including a cylindrical section conically reduced in diameter toward the outlet end and another cylindrical section conically increased in diameter from the inlet end, said both sections being joined endways, characterized in that a partition is provided in the cylindrical section conically reduced in diameter to divide the space therein into subspaces, whereby a fluid is passed through the subspaces to give separately a spiral flow and a piston flow to the other cylindrical section conically increased in diameter.

According to this invention, as stated above, a partition is provided in the cylindrical section conically reduced in diameter, and it divides the incoming gas into two streams, allowing them to enter the subspaces in the same cylindrical section. The gas streams then pass separately, in spiral and piston flows, into the other cylindrical section conically increased in diameter. This precludes the possibility of forming a backflow and deviative flow as in the past, and the stable gas flow ensures a steady, stabilized reaction.

The invention will be described in more detail below with reference to the accompanying drawings showing an embodiment thereof. In the drawings.

Figure 1:
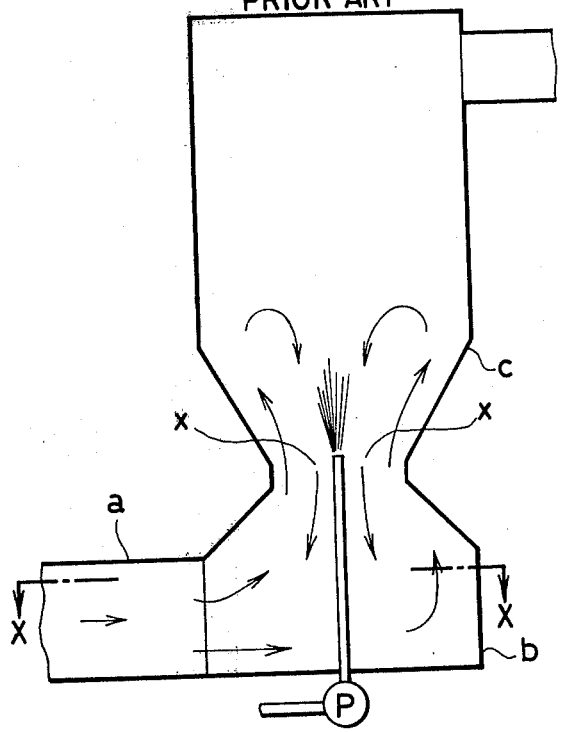
FIG. 1 is a diagrammatic vertical sectional view of a conventional reaction vessel.
Figure 3:
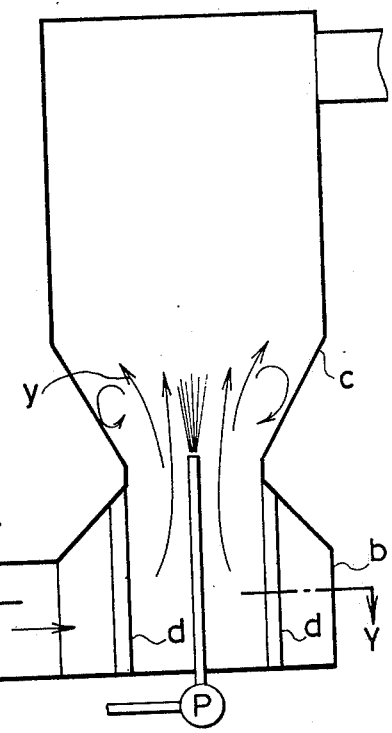
FIG. 3 is a diagrammatic vertical sectional view of another conventional reaction vessel.
Figure 2:
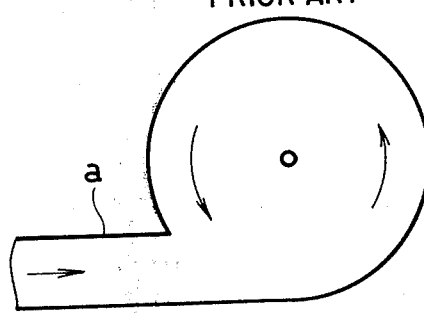
FIG. 2 is a sectional view taken on the line X-X of FIG. 1.
Figure 4:
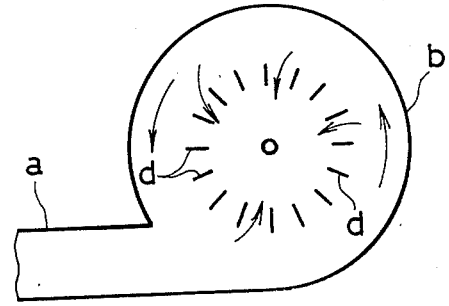
FIG. 4 is a sectional view taken on the line Y-Y of FIG. 3.
Figure 5:
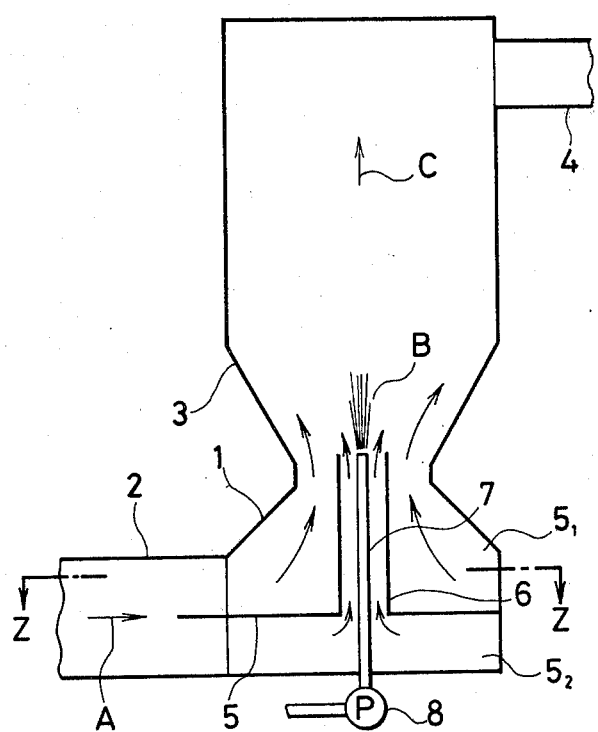
FIG. 5 is a diagrammatic vertical sectional view of a reaction vessel embodying the invention.
Figure 6:
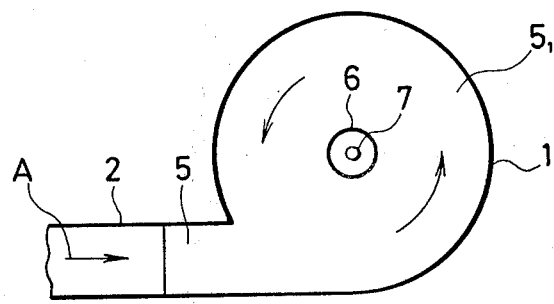
FIG. 6 is a sectional view taken on the line X-X of FIG. 5.

Referring now to FIGS. 5 and 6, there is shown an embodiment of the invention as applied to a reaction vessel which employs a slaked lime slurry as a reactant liquid for the removal of hydrogen chloride from waste gases. The vertical vessel is made up of a lower cylindrical section 1 conically reduced in diameter toward the upper end, or tapered upward, an inlet duct 2 tangentially connected to the lower part of the cylindrical section 1, an upper cylindrical section 3 conically increased in diameter to an intermediate part, or having an inverted-cone part tapering downward and united to the lower section endways, and an outlet duct 4 connected to the upper, normal-diameter part of the upper section.

Inside the upwardly tapered cylindrical section 1, there is held a horizontal flow-dividing partition 5 which divides the space within that section into an upper space $5_1$ and a lower space $5_2$. The partition 5 has a center opening and carries an upright piston-flow pipe 6 which is open at the lower end to the lower space and at the top to the space within the upper, downwardly tapered cylindrical section 3.

Across the lower space $5_2$ extends a chemical injection pipe 7 upwardly through the central axis of the piston-flow pipe 6. The lower end of the pipe is connected to a high-pressure pump 8.

Because the reaction vessel shown is built as above described, the waste gas A that enters the lower, upwardly tapered cylindrical section 1 via the inlet duct 2 is divided by the horizontal partition 5 into two streams to pass, respectively, through the upper and lower spaces inside the cylindrical section 1.

The gas stream in the upper space $5_1$ of the upwardly tapered cylindrical section 1 passes, while retaining its spiral flow pattern, into the upper, downwardly tapered cylindrical section 3. Meanwhile, the other gas stream in the lower space $5_2$ of the cylindrical section is led through the piston-flow pipe 6 into the central part of the upper section 3.

The gas streams thus separately pass through the upper and lower spaces of the upwardly tapered cylindrical section 1 into the upper, downwardly tapered section 3, respectively, in the form of spiral and piston flows. Hence a stable, combined gas flow is obtained without the formation of any backflow or deviative flow.

On the other hand, the slaked lime slurry B for the reaction use is forced through the chemical injection pipe 7 and is injected into the gas flow in the downwardly tapered cylindrical section 3 by the high-pressure pump 8 so as to remove hydrogen chloride from the flowing gas stream.

The gas treated in this way is then discharged from the reaction vessel through the outlet duct 4.

Experiments conducted in conformity with the present invention indicated that a flow quantity ratio of 0.7-2.3 piston flow to 1 spiral flow gives a stabilized flow.

Although the invention has been described with reference to its preferred embodiment, it is to be understood that the invention is not limited thereto but various modifications in design may be made without departing from the spirit or scope of the following claims.

For example, while the embodiment described herein adopts an upward gas flow system, the invention is equally applicable to a downward gas flow system with the apparatus of FIG. 5 generally turned upside down.

What is claimed is:

1. A reaction vessel, comprising:

a cylindrical section having an inlet duct connected thereto which is tangentially mounted to the cylindrical section;

a substantially horizontal partition member dividing said cylindrical section into an upper and a lower space, said partition being provided with a substantially centrally located upright piston flow pipe, said upright piston flow pipe having an upper end;

an injection pipe provided with an open end, said injection pipe being mounted within at least a portion of said upright piston flow pipe and said open end of said injection pipe positioned in the proximity of the upper opening of said upright piston flow pipe, said open end of said injection pipe directing flow in the direction of said piston flow;

a conical section formed above the upper space of said cylindrical section with a decreasing diameter proceeding in the upward direction; and a second conical section mounted above said first conical section, said second conical section having increasing diameter towards an outlet duct whereby a fluid entering said inlet duct is divided by said horizontal partition into two streams whereby the stream passing through said upper space is caused to form a spiral flow and the stream passing through said lower space forms a piston flow through said piston flow pipe.

2. A reaction vessel in accordance with claim wherein the dimensions are preselected to provide a flow quantity ratio of piston flow between 0.7 to 2.3 for a spiral flow of 1.

* * * * *